July 12, 1966 D. E. BLACKFORD 3,260,497
GAS VALVE OPERATING STRUCTURE
Filed March 19, 1964

INVENTOR.
DONALD E. BLACKFORD
BY
Barnes, Kisselle, Raisch & Choate
ATTORNEY 3,260,497
GAS VALVE OPERATING STRUCTURE
Donald E. Blackford, Detroit, Mich., assignor to Lincoln Brass Works, Detroit, Mich., a corporation of Michigan
Filed Mar. 19, 1964, Ser. No. 353,198
9 Claims. (Cl. 251—184)

This invention relates generally to gas valves of the type used in domestic gas ranges and similar equipment.

A conventional valve of this type has a valve body with a tapered internal chamber and a tapered rotatable valve plug therein. The valve plug and body are ported so that the flow of gas to a burner is controlled by rotation of the plug. The plug is spring pressed into engagement with the inner walls of the chamber to provide a seal against the flow of gas around the plug exterior, the spring pressure being relatively small so that the plug will not bind or seize against the chamber walls.

Conventionally, an operating stem projects axially from the plug to the valve exterior and an operating handle is axially frictionally fitted onto the stem. When the handle is pulled outwardly for removing the handle or, for example, experimentally by a child, the plug is pulled out of sealing engagement with the chamber walls and gas can escape around the plug. This creates the hazard of an explosion in the vicinity of the operating handle, which, though relatively mild, is adequate to burn a person's hand severely.

This danger has been eliminated in some gas valves by providing a two-piece operating stem so that outward force on the operating handle is not transmitted to the plug. However, this structure is relatively expensive and in addition requires special valve construction.

The object of this invention is to provide a very simple, inexpensive valve operating structure which eliminates the above-discussed disadvantages and can be applied optionally to conventional valves without modifying the basic structure thereof.

Generally, the invention contemplates the provision of an insert within the cap opening through which the valve stem projects. This insert is axially adjustable relative to a shoulder on the valve stem to provide a positive limit to the extent of displacement of the valve plug relative to the valve chamber. This displacement can be kept small enough to eliminate the danger of gas leakage in sufficient quantity to explode in the vicinity of the handle.

At the same time, the spacing between the insert and stem shoulder insure that the only axial seating force on the valve plug is the pressure of the spring referred to above. Thus, the valve plug will not bind or seize within the valve chamber. The valve cap and insert are provided with means which cooperate to secure the insert in its axially adjusted position. One form of the invention is shown in the accompanying drawings.

Figure 1:
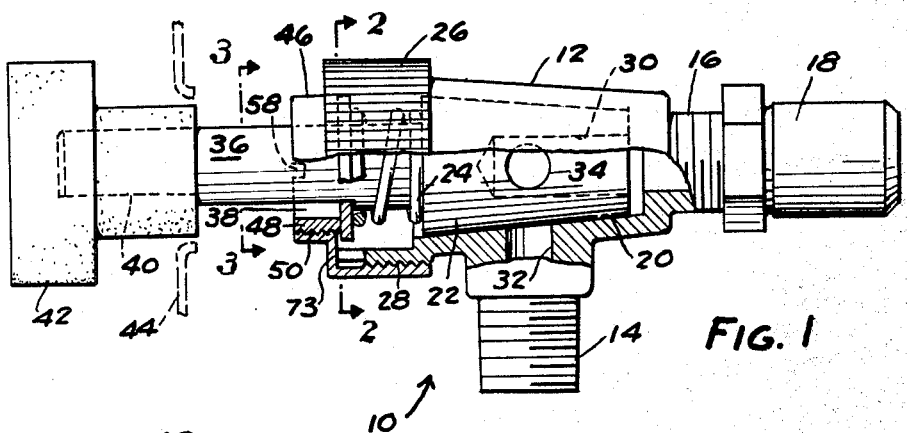
FIG. 1 is a generally elevational view of a valve incorporating the structure of this invention, parts being broken away and shown in section to illustrate structural details.
Figure 2:
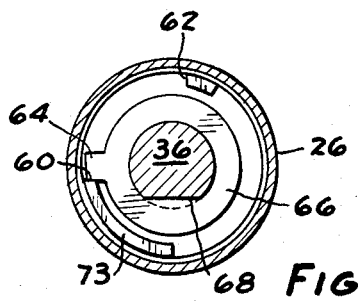
FIG. 2 is a sectional view on line 2—2 of FIG. 1.

Shown in the drawing is a valve 10 having a body 12 with an inlet nipple 14 threaded for connection to a gas supply line and an outlet nipple 16 threaded for the reception of a conventional hood 18 having an outlet orifice (not shown) through which gas is injected into the mixing tube (not shown) of a gas range burner or similar equipment. Valve body 12 has an internal tapered chamber 20 and a complementally tapered valve plug 22 is rotatably disposed in the chamber.

Plug 22 is held seated against the chamber walls by a compressed spring 24, thereby providing a seal between the plug and chamber walls so that gas cannot escape therebetween. The reaction force of spring 24 is borne by a cap 26 threaded onto the valve body as at 28. Valve plug 22 has an internal gasway 30 communicating with outlet 16. Body 12 and plug 22 are provided with ports 32 and 34 respectively which pass into and out of registry upon turning the valve plug to control the flow of gas through the valve.

The valve plug is turned by means of an operating stem 36 thereon which projects outwardly through an opening 38 in valve cap 26. The operating stem has a flat 40 adjacent its outer end which is inserted with a frictional sliding fit within a complementally shaped opening of an operating handle 42. Thus, by turning handle 42, plug 22 is turned within chamber 20. A portion of a gas range cabinet or similar equipment is shown in phantom at 44.

Figure 6:
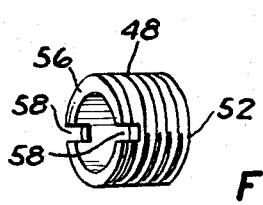
FIG. 6 is a perspective view of an adjustable insert separate from the other parts.

Valve cap 26 has an axially outwardly extending sleeve 46 which defines opening 38 and a tubular insert 48 is threaded into the sleeve as at 50. Insert 48 is disposed within opening 38 and also surrounds valve stem 36. Insert 48 has an actual inner end 52 (FIG. 7) disposed toward the interior of cap 26. Operating stem 36 is provided with an outwardly disposed generally radial shoulder 54 which is axially displaced from the tapered portion of valve plug 22 as shown. By rotating insert 48 within sleeve 46, the insert can be moved axially relative to shoulder 54. The insert is provided adjacent its axially outer end 56 with a pair of axial slots 58 (FIG. 6) for the reception of a tool to facilitate turning the insert within the sleeve.

In the form of the valve shown, the valve body is provided with two shoulders 60 and 62 which provide stops for a finger 64 on a control washer 66 surrounding stem 36, the washer and stem having interengaged complemental flats as indicated at 68. Shoulders 60 and 62 provide stops at the Off and full-On positions of valve plug 22. Actual inner end 52 of insert 48 engages one face 70 of washer 66, and spring 24 engages the other face with the result that washer 66 shifts axially with insert 48.

Figure 7:
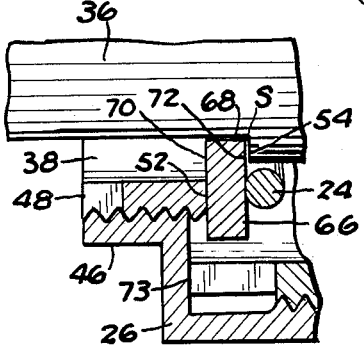
FIG. 7 is an enlarged fragmentary sectional view of the valve illustrating certain structural details.

The washer has a radially inward face portion 72 which is disposed toward and axially aligned with shoulder 54 (FIG. 7). Since this face moves toward and away from the shoulder commensurate with axial shifting of insert 48, face portion 72 comprises the effective axially inner end of insert 48. This language is utilized in certain of the claims.

In some valves, controlling washer 66 may not be used; and in such case, the effective inner end of the insert 48 and its actual inner end 52 may be identical. In still other types of valves, so-called clicking washers are used in addition to a limit stop washer 66 for the purpose of providing audible or other signals indicating various valve positions. For example, see Mueller 2,711,191. In such a case, the clicking washer would be positioned axially inwardly of washer 66, the face portion thereof apposed to shoulder 54 would comprise the effective inner face of insert 48. In any event, the term "effective axially inner end" is intended to refer to the inner face portion apposed to shoulder 54 which moves with insert 48 and which serves to positively limit axially outward displacement of valve plug 22.

Figure 4:
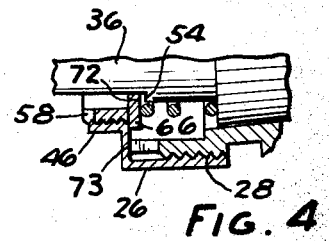
FIG. 4 is a fragmentary sectional view of a step in assembly of the valve.

To assemble the valve, valve plug 22 is inserted into chamber 20. Spring 24 and washer 66 are disposed around the valve stem, and then cap 26 is threaded onto the valve body until it bottoms firmly against an abutment 73 on valve body 12. Insert 48 may be partially threaded into opening 38 prior to application of the cap to the valve body if desired. The parts are now in the general relation shown in FIG. 4 wherein the effective inner end 72 of insert 48 is spaced a considerable distance from shoulder 54.

Figure 5:
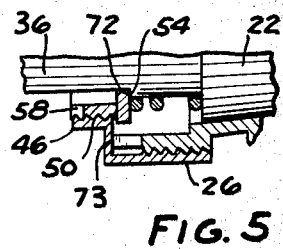
FIG. 5 is a view similar to FIG. 4 showing a subsequent step in assembly of the valve.

A suitable tool is then inserted over valve stem 36 and into slots 58 in the insert. By means of the tool, the insert is turned to advance its effective inner end 72 into abutment with shoulder 54 as illustrated in FIG. 5. The pitch of threading 50 between insert 48 and sleeve 46 is known. Therefore, upon turning insert 48 in the opposite direction through a predetermined angle, the insert and its effective inner end 72 retract a predetermined axial distance from shoulder 54.

Figure 3:
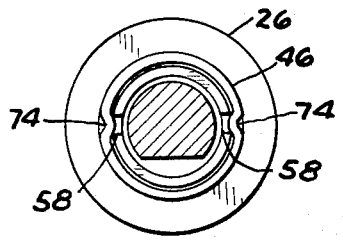
FIG. 3 is a sectional view on line 3—3 of FIG. 1.

As a final step, portions of sleeve 46 overlying notches 58 are indented inwardly into the notches as at 74 (FIG. 3) thereby anchoring the sleeve and insert non-rotatably and axially in fixed positions relative to each other. This establishes a maximum axial spacing S between end 72 and shoulder 54 as shown in somewhat exaggerated manner in FIG. 7 and provides a positive limit to the extent of axially outward displacement of valve plug 22 should handle 42 or the valve stem be pulled outwardly.

Space S must be at least .001″ to .002″ to insure that the sole seating force of plug 22 against the wall of chamber 20 is spring 24 so that the plug will not seize against the chamber wall. On the other hand, space S cannot exceed about .018″ in order to insure that if plug 22 is pulled out of sealing engagement with the chamber wall, the rate of gas escape will not support combustion adjacent the valve. The present invention enables the manufacturer by ordinary manufacturing techniques to maintain space S within a range of about .005″ to .010″.

Even though the relative axial positions of shoulder 54 and abutment 73 may vary up to about $\frac{1}{32}$″ as a result of ordinary manufacturing tolerances, space S can be held within the small range indicated because the reference point used is the axially outer face of abutment 73 which is provided before the parts are assembled.

After sleeve portions 74 have been indented into slots 58, insert 48 becomes a part of cap 26. Thus, upon subsequent disassembly and reassembly of the valve components, effective end 72 of the insert returns to its proper spacing S from shoulder 54 without additional adjustment.

If the limited displacement safety feature is not required of valve 10, a valve cap without sleeve 46 and insert 48 may be used without modification of any of the rest of the valve structure.

I claim:

1. In a valve for gas ranges and the like having a body with a tapered chamber within which a complementally tapered rotatable valve plug is urged into seated and sealed relation by a spring reacting against a cap on said body, and an operating stem on said plug projecting through an opening in said cap to the exterior of said valve, improved structure whereby the axial displacement of said plug from said seated relation to said chamber is positively limited to a predetermined maximum, said structure comprising, means providing a shoulder on said stem axially spaced from the tapered portion of said plug, an insert disposed within said cap opening, said insert having an effective axially inner end disposed toward the cap interior and axially aligned with said shoulder, said insert being axially shiftable within said opening and said effective inner end thereof being thereby axially adjustable to a predetermined spacing relative to said shoulder, said insert having means exposed to the exterior of said cap adapted to receive insert-shifting force, said cap and insert having means cooperable to secure the same fixedly in their adjusted relative axial positions.

2. The improved structure defined in claim 1 wherein said insert has an actual inner end engaged with one side of a valve controlling washer device, said spring engaging the opposite side of said device, said device being axially shiftable relative to said stem, said other side of said device providing said effective inner end of said insert.

3. The improved structure defined in claim 1 wherein said shoulder is disposed within said cap.

4. The improved structure defined in claim 3 wherein said shoulder extends generally radially of said stem.

5. The improved structure defined in claim 1 wherein said insert has a threaded connection within said cap opening so that said insert can be advanced to abut said effective inner end against said shoulder, said effective inner end being retractable to said predetermined spacing from said shoulder responsive to retrograde turning of said insert through an angle predetermined by the pitch of said threaded connection.

6. The improved structure defined in claim 1 wherein said cap has an axially extending sleeve surrounding said stem and defining said opening, said insert being tubular and being disposed around the interior of said sleeve and the exterior of said stem.

7. The improved structure defined in claim 6 wherein said tubular insert has an axial length greater than that of said sleeve.

8. The improved structure defined in claim 6 wherein said tubular insert has a threaded connection within said sleeve, said insert having axial slotting adjacent its outer end which provides said force-receiving means, said sleeve having portions overlying said slotting and indented thereinto to provide said cooperable means.

9. In a valve for gas ranges and the like having a body with a tapered chamber within which a complementally tapered rotatable valve plug is urged into seated and sealed relation by a spring reacting against a cap on said body, and an operating stem on said plug projecting through an opening in said cap to the exterior of said valve, improved structure whereby the axial displacement of said plug from seated relation to said chamber is positively limited to a predetermined maximum, said structure comprising, means providing a generally radial shoulder on said stem spaced axially outwardly from the tapered portion of said plug and disposed within said cap, said cap having an axially extending sleeve portion surrounding said stem, a tubular insert having a threaded connection within said sleeve and surrounding said stem, said insert having an effective axially inner end disposed toward and axially aligned with said shoulder, said effective inner end being axially shiftable into abutment with said shoulder and retractable therefrom to a predetermined spacing responsive to rotation of said sleeve first in one direction and then the other, said insert being provided with slotting adjacent its axially outer end adapted to receive a tool for turning said insert, said sleeve having portions overlying said slotting, said sleeve portions being indented into said slotting to secure said cap and insert fixedly in their adjusted relative axial positions.

No references cited

MARTIN P. SCHWADRON, *Primary Examiner.*

H. WEAKLEY, *Examiner.*